United States Patent
Chang

(10) Patent No.: US 8,117,546 B2
(45) Date of Patent: Feb. 14, 2012

(54) METHOD AND RELATED DISPLAY DEVICE FOR DISPLAYING PICTURES IN DIGITAL PICTURE SLIDE SHOW

(75) Inventor: Pei-Ken Chang, Nantou County (TW)

(73) Assignee: CyberLink Corp., Xindian, New Taipei (TW)

( * ) Notice: Subject to any disclaimer, the term of this patent is extended or adjusted under 35 U.S.C. 154(b) by 571 days.

(21) Appl. No.: 11/845,086

(22) Filed: Aug. 26, 2007

(65) Prior Publication Data

US 2009/0051826 A1 Feb. 26, 2009

(51) Int. Cl.
*G06F 3/14* (2006.01)
*G06F 3/17* (2006.01)

(52) U.S. Cl. ....... 715/730; 345/98; 345/619; 348/231.4; 348/441; 382/118; 386/126; 725/66; 725/92

(58) Field of Classification Search .......... 715/200–277, 715/730; 700/701–799, 800–866; 345/30–111, 345/619; 348/206–231.9, 441; 375/237–242; 380/200–242; 369/53.1–53.45; 386/46–131; 725/86, 92; 382/118

See application file for complete search history.

(56) References Cited

U.S. PATENT DOCUMENTS

| | | | |
|---|---|---|---|
| 7,006,575 B2 * | 2/2006 | Yamaguchi et al. | 375/240.26 |
| 7,084,850 B2 * | 8/2006 | Hiyama et al. | 345/98 |
| 7,340,765 B2 * | 3/2008 | Feldmeier | 725/92 |
| 2003/0088874 A1 * | 5/2003 | Bazin et al. | 725/86 |
| 2004/0189827 A1 * | 9/2004 | Kim et al. | 348/231.4 |
| 2005/0117032 A1 * | 6/2005 | Ueda et al. | 348/231.4 |
| 2006/0023117 A1 * | 2/2006 | Feldmeier | 348/441 |
| 2006/0062388 A1 * | 3/2006 | Aggarwal | 380/239 |
| 2006/0133251 A1 * | 6/2006 | Thangaraj et al. | 369/59.17 |
| 2006/0239663 A1 * | 10/2006 | Nonomura et al. | 386/126 |
| 2007/0143683 A1 * | 6/2007 | Quimby | 715/730 |
| 2009/0022373 A1 * | 1/2009 | Winter | 382/118 |
| 2009/0066722 A1 * | 3/2009 | Kriger et al. | 345/619 |
| 2009/0169183 A1 * | 7/2009 | Fujinami et al. | 386/126 |

* cited by examiner

*Primary Examiner* — Ruay Ho
(74) *Attorney, Agent, or Firm* — Winston Hsu; Scott Margo

(57) ABSTRACT

A method for displaying pictures during a digital picture slide show includes receiving a plurality of pictures, determining display characteristics of the plurality of pictures according to weighting values of the plurality of pictures, and displaying the plurality of pictures according to the display characteristics of the plurality of pictures.

19 Claims, 5 Drawing Sheets

METHOD AND RELATED DISPLAY DEVICE FOR DISPLAYING PICTURES IN DIGITAL PICTURE SLIDE SHOW

BACKGROUND OF THE INVENTION

1. Field of the Invention

The present invention relates to a method and related display device for displaying pictures in a digital picture slide show, and more particularly, to a method and related display device for displaying pictures during the digital picture slide show with different display characteristics according to weighting values of the pictures.

2. Description of the Prior Art

With the development of digital cameras and image processing technology, the applications of digital pictures (or digital photos) are more and more popular in daily life. Users can easily recall the occasions and sceneries by viewing the pictures with devices having simple image processing functions, such as computers, PDAs or mobile phones. However, compared to videos or animations, the pictures are still images, and thus, an attractive way like a slide show for displaying pictures or still images more animatedly and vividly is desired, so that conventional slide show software has become a popular tool for users to share photos with others.

A slide show can display a plurality of still images in order, and is already a basic function of many image browsing software packages, such as ACDSee, Power Cinema, or other slide show programs. Currently, many websites like Flicker.com, picasaweb.google.com and wretch.cc also provide such a function on an Internet album for displaying pictures in the form of a web slide show. Please refer to FIG. 1. FIG. 1 is a schematic diagram of a conventional slide show 10 for displaying digital pictures. As shown in FIG. 1, the slide show 10 includes digital pictures P1~Pn to be displayed. In general, the slide show 10 displays the digital pictures P1~Pn in a predetermined order with the same display duration T for each picture. However, each of the pictures may be preferred by the users in different extents, so that the users may want to modify the pictures to be shown with different time intervals or with different display effects, which may be done by manually adjusting display duration of each picture or manually selecting display effects to add on a certain preferred image. None of the prior art slide show provides a better, more appropriate and convenient presentation manner to display the digital pictures accordingly.

Thus, the prior art has not given consideration to the generation of a highly sophisticated slide show.

SUMMARY OF THE INVENTION

It is therefore a primary objective of the present invention to provide a method for displaying pictures during a digital picture slide show.

The present invention discloses a method for displaying pictures during a digital picture slide show. The method comprises receiving a plurality of pictures, determining display characteristics of the plurality of pictures according to weighting values of the plurality of pictures, and displaying the plurality of pictures according to the display characteristics of the plurality of pictures.

The present invention further discloses a display device for displaying pictures in a digital picture slide show. The display device comprises a reception end, a determination unit and a display unit. The reception end is utilized for receiving a plurality of pictures. The determination unit determines display characteristics of the plurality of pictures according to weighting values of the plurality of pictures. The display unit, coupled to the determination unit, displays the plurality of pictures according to the display characteristics of the plurality of pictures.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
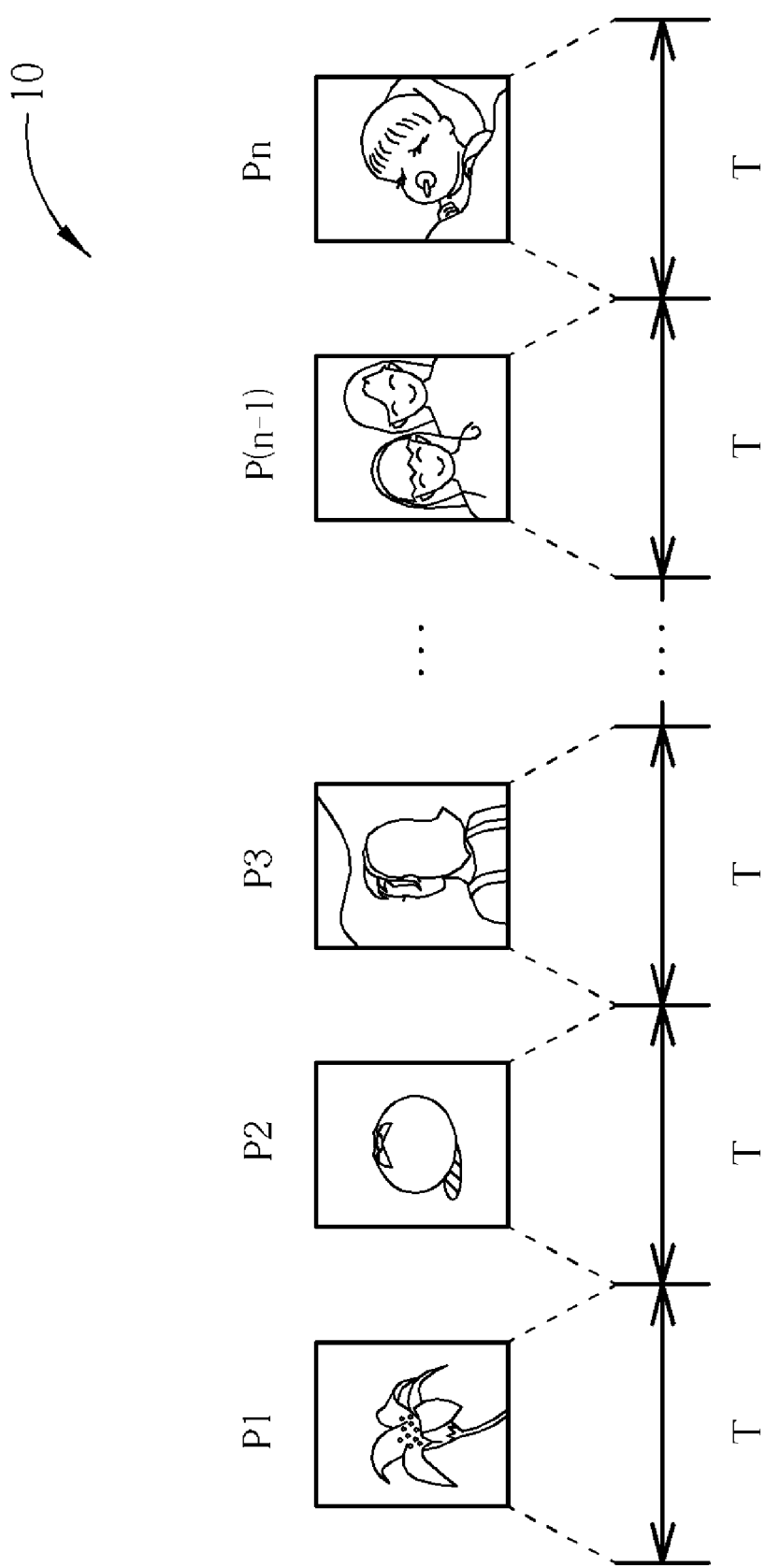
FIG. 1 is a schematic diagram of a prior art slide show for displaying digital pictures.
Figure 2:
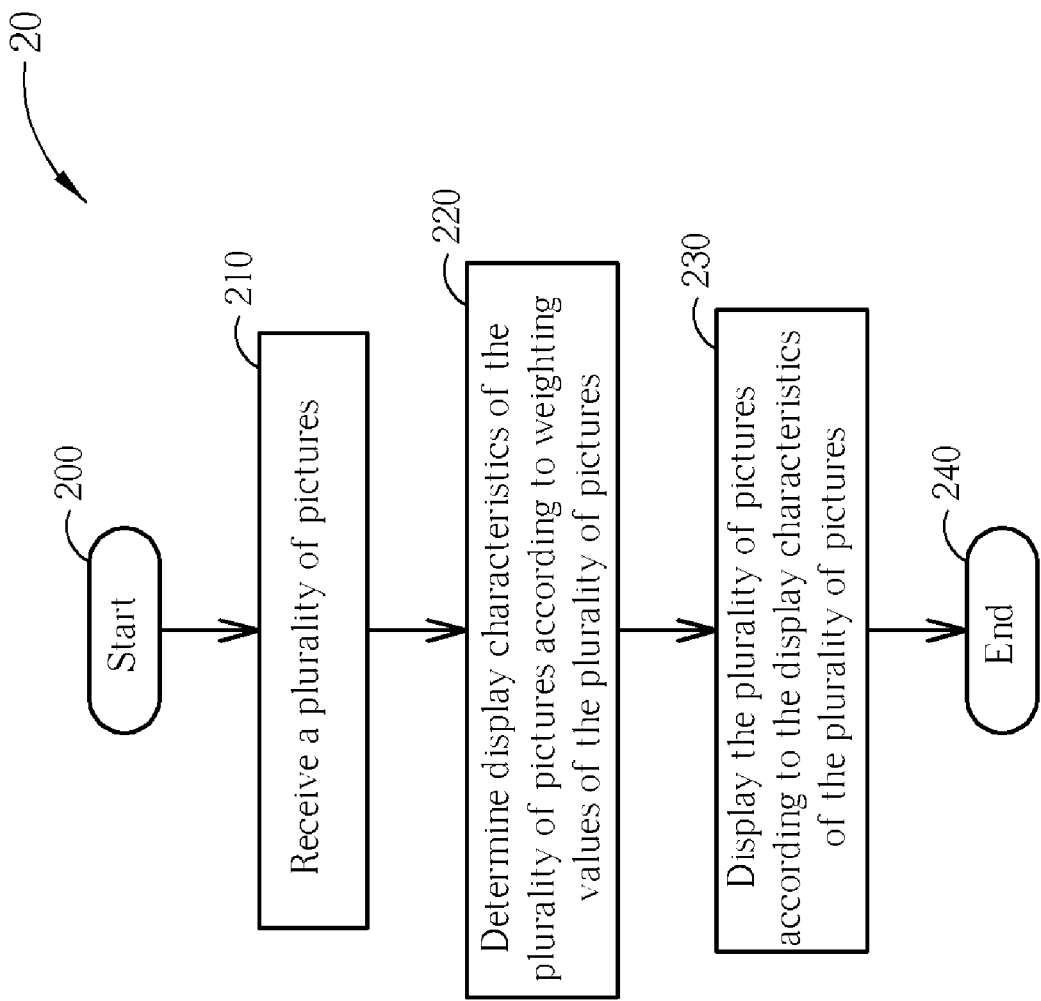
FIG. 2 is a flow chart of a process of the present invention for displaying pictures during a digital picture slide show.

Please refer to FIG. 2. FIG. 2 is a flow chart of a process 20 of the present invention for displaying pictures during a digital picture slide show. The process 20 includes the following steps:

Step 200: start.
Step 210: receive a plurality of pictures.
Step 220: determine display characteristics of the plurality of pictures according to weighting values of the plurality of pictures.
Step 230: display the plurality of pictures according to the display characteristics of the plurality of pictures.
Step 240: end.

According to the process 20, the present invention firstly receives the plurality of pictures, and then determines display characteristics of the plurality of pictures according to weighting values of the plurality of pictures. The display characteristics of the plurality of pictures can be display durations, display orders, or display effects of the plurality of pictures. At last, the present invention displays the plurality of pictures in the form of a slide show according to the display characteristics of the plurality of pictures.

The weighting values of the plurality of pictures can be determined according to browsing status, viewing statistics, rating results, comment counts or other image information gathered from the Internet. In addition, the weighting values can further be determined according to image analysis results produced by an analyzing program, or metadata of each picture including attributes such as user preferences, or even any combinations of those mentioned above.

Figure 3:
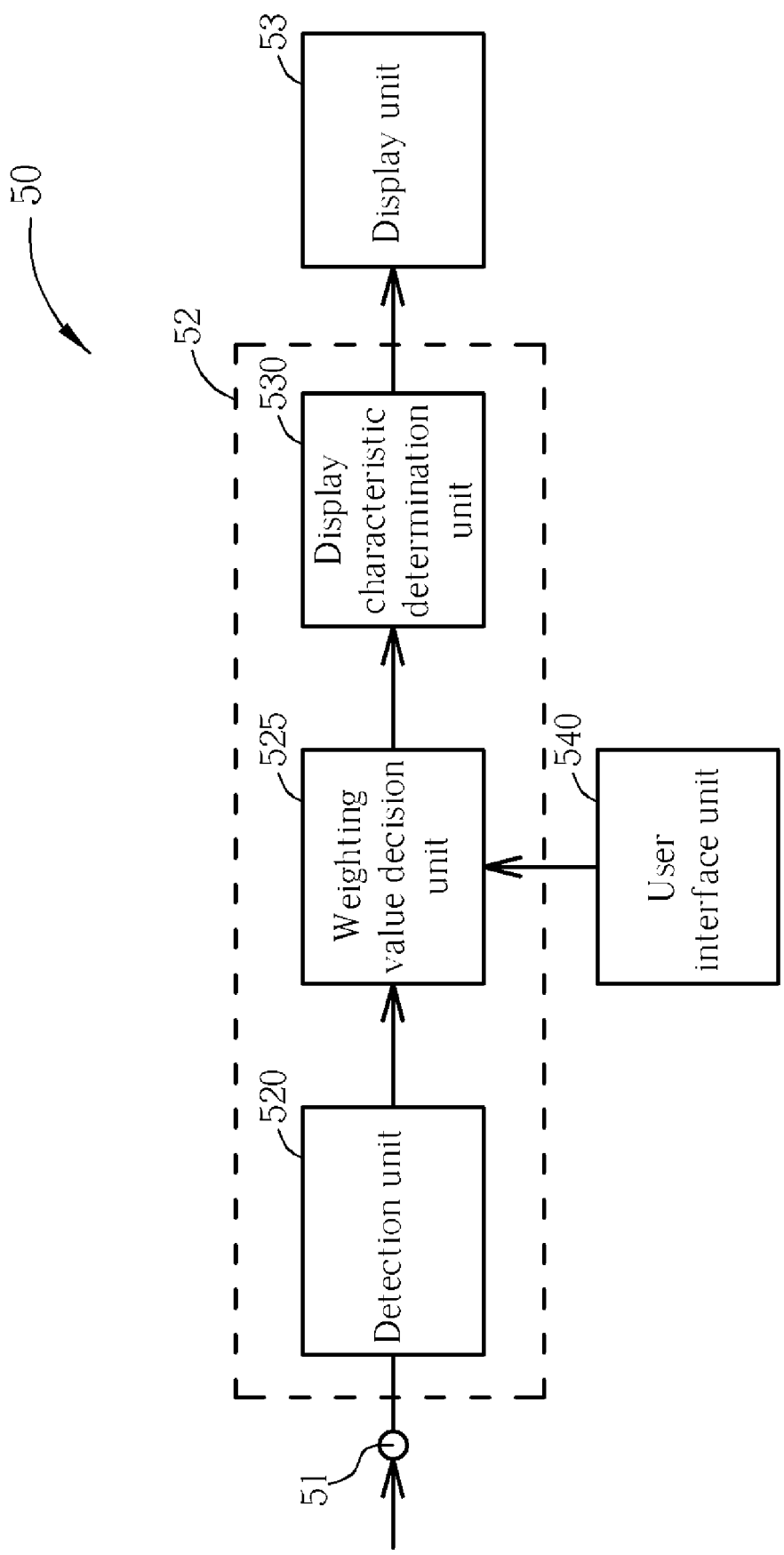
FIG. 3 is a schematic diagram of a display device of the present invention for displaying pictures in a digital picture slide.

Please refer to FIG. 3. FIG. 3 is a schematic diagram of a display device 50 of the present invention for displaying pictures in a digital picture slide. The display device 50 is utilized for realizing the process 20, and includes a reception end 51, a determination unit 52 and a display unit 53. The reception end 51, such as a memory card slot of a computer device, a USB connection slot connected with a digital camera, or a website server, is utilized for receiving a plurality of pictures. The determination unit 52 is coupled to the reception end 51, and is utilized for determining the display characteristics such as display durations, display orders or display effects of the plurality of pictures according to the weighting values of the plurality of pictures. The display unit 53 is coupled to the determination unit 52, and is utilized for displaying the plurality of pictures in the form of a slide show according to the display characteristics of the plurality of pictures.

Moreover, the determination unit 52 can further include a detection unit 520, a weighting value decision unit 525 and a display characteristic determination unit 530. The detection unit 520 is coupled to the reception end 51, and is utilized for detecting the above-mentioned image information (e.g. browsing status, viewing statistics, rating results, comment counts and so on) of the plurality of pictures to generate a detection result. Thus, the weighting value decision unit 525 can then determine the weighting values of the plurality of pictures according to the detection result outputted by the detection unit 520. The display characteristic determination unit 530 determines the display characteristics such as display durations, display orders or display effects according to the weighting values outputted by the weighting value decision unit 525.

The display device 50 may further include a user interface unit 540 for providing users to adjust the weighting values according to user's preferences. Note that, the display device 50 can be a personal computer, an PDA, a mobile phone and other mobile devices for displaying pictures in the form of a slide show, or can be a web server for displaying the slide show on an internet album as well.

Several image file formats enable users to store metadata along with an image, which is so-called a picture metadata. The picture metadata are tagged with for example, title, width, subjects, related emotions, time, location, date, and other descriptive phrases. Moreover, a picture metadata can further be used to convey additional information about the picture, the scene, the camera, the people in the picture, or other related data such as GPS info. The Internet album, Flickr is an example of an image tagging service, where users not only upload images but also describe the contents of the images. In another example, users can also tag photos for organization purposes using Adobe's Extensible Metadata Platform (XMP) language, for example.

Therefore, according to the weighting value of each of the plurality of pictures, the display device 50 of the present invention can determine the display durations, the display orders or the display effects of the plurality of pictures by the display characteristic determination unit 530 when displaying the slide show. Namely, in the present invention, the pictures displayed during a slide show can have different display characteristics according to the weighting values of the plurality of pictures, so that the pictures that are more interesting for the users can be displayed much longer, with a higher priority, or with more display effects such as enlargement, shrinkage, transition effects such as fade-in, fadeout, and so on.

Figure 4:
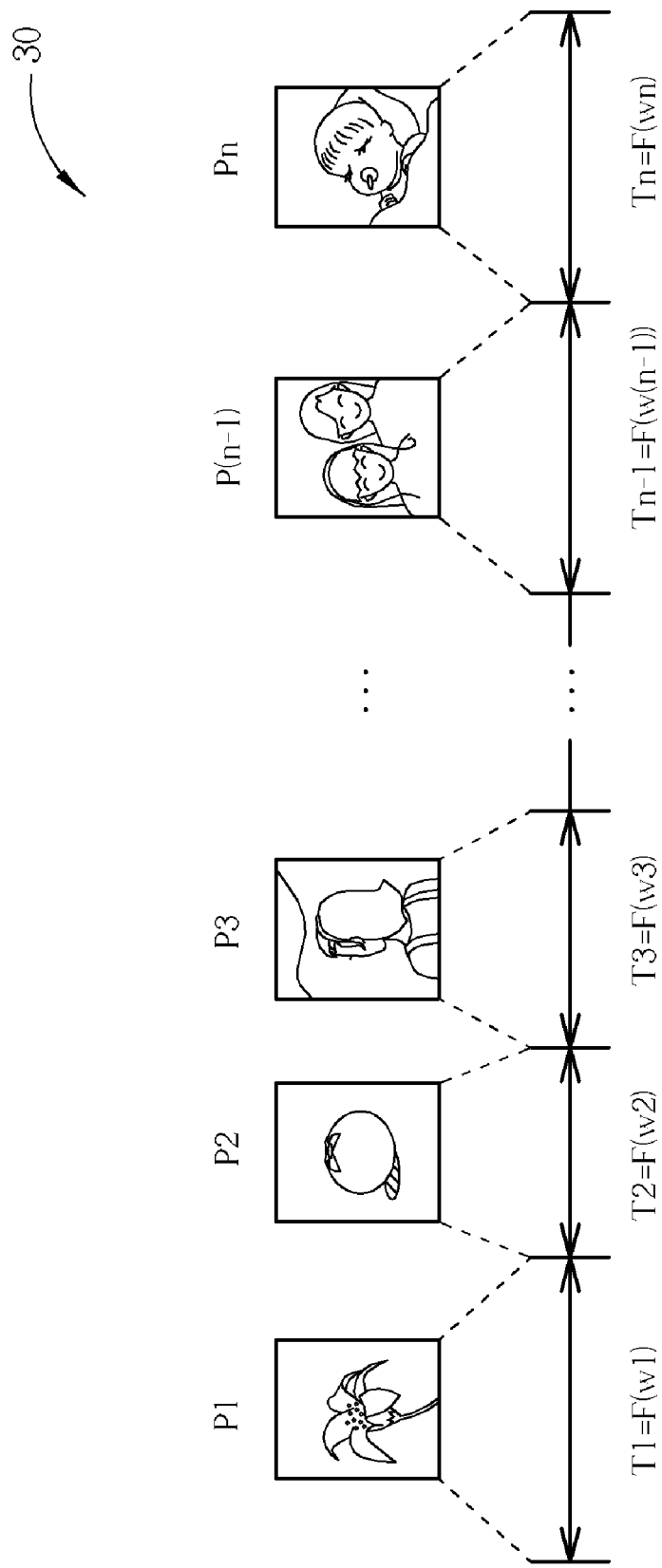
FIG. 4 is a schematic diagram of a slide show for displaying digital pictures according to an embodiment of the present invention.

For example, please refer to FIG. 4. FIG. 4 is a schematic diagram of a slide show 30 for displaying digital pictures according to an embodiment of the present invention. The slide show 30 includes digital pictures P1~Pn. As shown in FIG. 3, when the slide show 30 displays, the digital pictures P1~Pn are displayed in order with corresponding display durations T1~Tn. Compared to the prior art, the display durations T1~Tn of the present invention are not the same, and can be automatically varied according to weighing values W1~Wn corresponding to the digital pictures P1~Pn. Note that, before displaying a slide show, correlation between the weighting values and the display durations can be predetermined by the display device 50, or can be inputted by the users through the user interface unit 540. For example, the display duration corresponding to each of the digital pictures P1~Pn can be predetermined to be a linear or quadratic function of the weighting value corresponding to each of the digital pictures P1~Pn, so that the display durations T1~Tn can be expressed as T1=F(W1), T2=F(W2), . . . , Tn=F(Wn). Preferably, the function can be set as an increasing function, i.e. each of the display durations F(W1)~F(Wn) is positively correlated to each of the weighting values W1~Wn. In this case, if a picture is more interesting for the users, the weighting value corresponding to the picture can be increased, so that the picture can be displayed much longer in the slide show 30.

For this reason, the weighting values W1~Wn can be determined by the determination unit 52 of the display device 50 according to the browsing status of the digital pictures P1~Pn on the Internet or in a personal computer. For example, the display device 50 detects the browsing counts (or browsing times, number of hits, or viewing statistics) of the pictures by the detection unit 520, and then reorders the pictures from higher browsing counts to lower browsing counts, or categorizes the picture with higher browsing counts into an interesting category. For example, the detection unit 520 may detect the browsing counts by detecting the result of a hit counter which tracks hits to a certain image or a webpage that displays an image. Since the picture in the interesting category is assumed to be more interesting for a user, the display device 50 increases corresponding weighting value of the interested picture when the user can click on or select the picture for appreciating it much longer, so that the interested picture can be displayed much longer in the slide show 30. Namely, the weighting values W1~Wn can also be determined according to the browsing counts or viewing statistics corresponding to the pictures P1~Pn, which means that the more the number of times that the picture is browsed or hit before, the greater the corresponding weighting value is. Thus, if a picture is more interesting for the users, the picture can be displayed much longer in the slide show 30.

In addition, the weighting values W1~Wn can also be determined according to the rating results and/or the comment counts of the digital pictures P1~Pn on an Internet album. In this case, when the picture is more popular or more recommended on the Internet album, the weighting value of the corresponding picture can be increased accordingly, so that the picture can be displayed much longer in the slide show 30.

Figure 5:
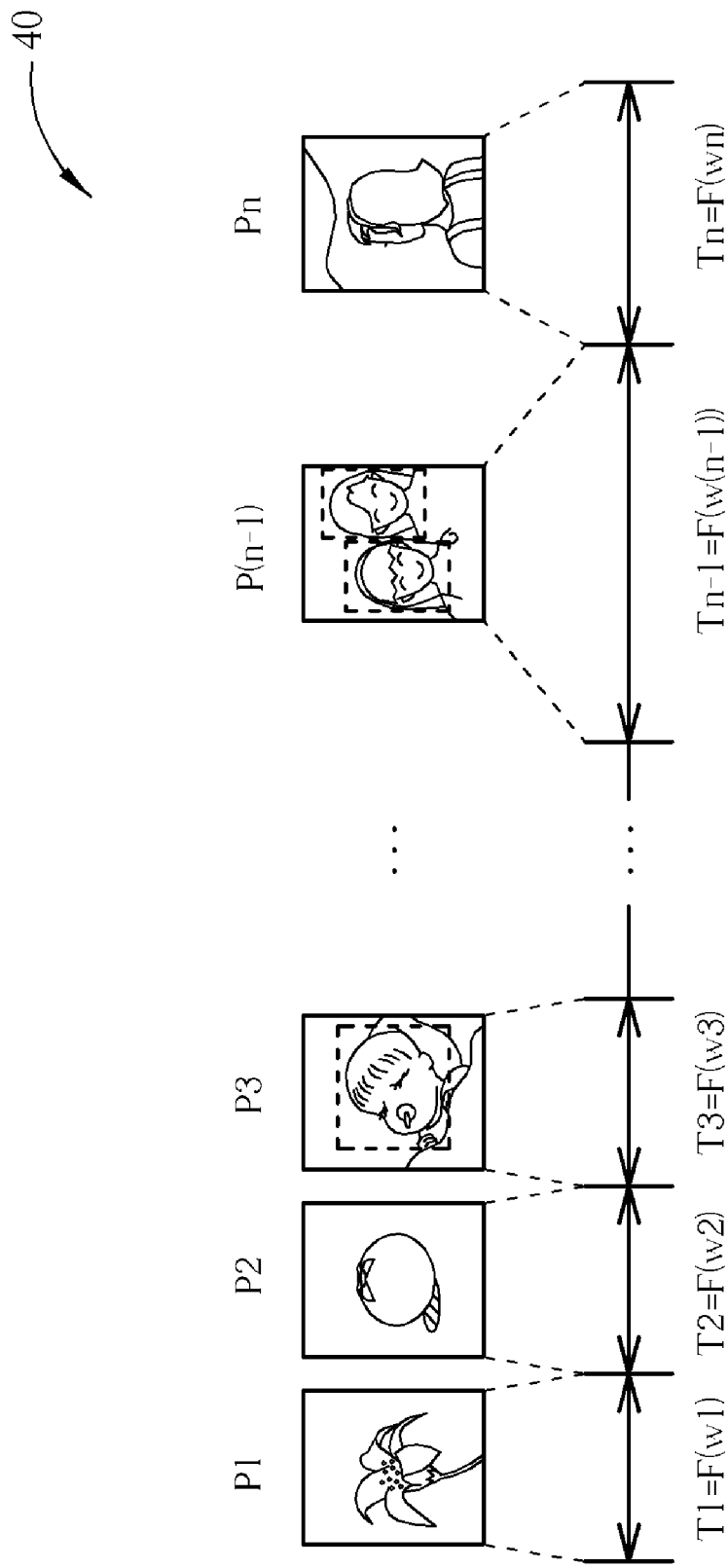
FIG. 5 is a schematic diagram of a slide show for displaying digital pictures according to another embodiment of the present invention.

Further, the weighting values W1~Wn can be determined according to the image analysis results of the digital pictures P1~Pn. For example, the analysis results can be generated by recognizing the number of faces in each of the pictures P1~Pn. Thus, if a picture has more faces recognized, the corresponding weighting value can be increased, so that the picture can be displayed much longer, with a higher priority, or with more display effects during the slide show. Please refer to FIG. 5. FIG. 5 is a schematic diagram of a slide show 40 for displaying digital pictures according to another embodiment of the present invention. As shown in FIG. 5, when the slide show 40 displays, digital pictures P1~Pn are displayed in order with display durations T1~Tn, respectively corresponding to weighting values W1~Wn. Compared with the slide show 30, the difference is that the weighting values W1~Wn varies according to the number of faces recognized in the corresponding pictures. Thus, when pictures have more faces recognized, such as the pictures P3 and P(n−1), the corresponding weighting values W3 and W(n−1) can be increased accordingly, so that the pictures can be displayed much longer in the slide show 40.

On the other hand, the image analysis results of the digital pictures P1~Pn can be generated by recognizing specific faces or objects in each of the plurality of pictures as well. The present invention does not limit the manner to recognize specific faces. The face can be recognized by any conventional methods well known by those skilled in the art, such as the methods provided in the articles: "Beyond Eigenfaces: Probabilistic Matching for Face Recognition (Moghaddam B., Wahid W. and Pentland A., April 1998; *International Conference on Automatic Face & Gesture Recognition*, Nara, Japan.)" and "Bayesian Face Recognition Using Deformable Intensity Surfaces (Moghaddam B., Nastar C. and Pentland A., June 1996; *IEEE Conf. on Computer Vision & Pattern Recognition*, San Francisco, Calif.)" That means, when the content of one of the pictures conforms to the specific faces or objects pre-specified by users, the corresponding weighting value can be increased. Thus, the picture can be displayed much longer, with a higher priority, or with more display effects during the slide show. It is helpful for the user to find out a certain face when the number of the pictures being displayed in the slide show is considerable.

Moreover, the weighting values W1~Wn can be determined according to user preferences or other attributes stored in metadata of each picture. In this case, when the slide show displays, the present invention can adjust the weighting values of the corresponding pictures according to the user preferences by reading attached metadata or tags of the pictures. That is, if a user's preference is animal pictures, by reading the attached metadata or the tags of the pictures being displayed, the weighting values of animal pictures can be increased accordingly, so that the related pictures can be displayed much longer, with a higher priority, or with more display effects during the slide show. In another case, the metadata of each picture may contain attributes such as GPS, location, date, time, name of the picture, and so on. Note that, the present invention does not limit attributes of the metadata of a picture. The weighting values can be varied according to different attributes, and the relation between the weighting values and the attributes can be set in advance before a user starts to display a slide show.

Please note that, the weighting values of the pictures can also be determined according to practical demands by those skilled in the art, which are also in the range of the present invention. Besides, the display manners of the slide show, such as the display durations, the display orders, or the display effects corresponding to the pictures are merely utilized as exemplary illustrations of the present invention, but not a limitation of the present invention.

In summary, when displaying the slide show, the present invention can determine the display durations, the display orders or the display effects of the pictures according to the weighting values of the pictures. Thus, the pictures displayed during a slide show can have different display characteristics according to the weighting value of the pictures. In addition, the present invention can be applied for not only the Internet album, but also image browsing software in personal computers, PDAs, mobile phones, and other mobile devices.

Those skilled in the art will readily observe that numerous modifications and alterations of the device and method may be made while retaining the teachings of the invention.

What is claimed is:

1. A method for displaying a digital picture slide show comprising:
    receiving a plurality of pictures;
    determining display characteristics of the plurality of pictures according to weighting values of the plurality of pictures, wherein the display characteristics of the plurality of pictures at least comprises display durations of the plurality of pictures, and wherein each of the display durations is positively correlated to each of the weighting values; and
    displaying the plurality of pictures according to the display characteristics of the plurality of pictures to generate the digital picture slide show.

2. The method of claim 1, wherein the display characteristics of the plurality of pictures further comprises display effects of the plurality of pictures.

3. The method of claim 1, wherein the weighting values are determined according to browsing counts of the plurality of pictures.

4. The method of claim 1, wherein the weighting values are determined according to rating results of the plurality of pictures.

5. The method of claim 1, wherein the weighting values are determined according to comment counts of the plurality of pictures.

6. The method of claim 1, wherein the weighting values are determined according to image analysis results of the plurality of pictures.

7. The method of claim 6, wherein the image analysis results are generated by recognizing the number of faces in each of the plurality of pictures.

8. The method of claim 6, wherein the image analysis results are generated by recognizing specific faces in each of the plurality of pictures.

9. The method of claim 6, wherein the image analysis results are generated by recognizing specific objects in each of the plurality of pictures.

10. The method of claim 1, wherein the weighting values are determined according to attributes corresponding to user preferences.

11. The method of claim 1, wherein displaying the plurality of pictures according to the display characteristics of the plurality of pictures to generate the digital picture slide show comprises displaying the plurality of pictures according to the display characteristics of the plurality of pictures in an Internet album.

12. A display device for displaying a digital picture slide show comprising:
    a reception end for receiving a plurality of pictures;
    a determination unit, coupled to the reception end, for determining display characteristics of the plurality of pictures according to weighting values of the plurality of pictures, wherein the display characteristics of the plurality of pictures at least comprises display durations of the plurality of pictures, and wherein each of the display durations is positively correlated to each of the weighting values; and
    a display unit, coupled to the determination unit, for displaying the plurality of pictures according to the display characteristics of the plurality of pictures to generate the digital picture slide show.

13. The display device of claim 12, wherein the determination unit further comprises:
    a detection unit, coupled to the reception end, for detecting picture information of the plurality of pictures to generate a detection result;
    a weighting value decision unit for determining the weighting values of the plurality of pictures according to the detection result outputted by the detection unit; and
    a display characteristic determination unit for determining the display characteristics of the plurality of pictures according to the weighting values outputted by the weighting value decision unit.

14. The display device of claim 13, wherein the image information of the plurality of pictures comprise browsing counts of the plurality of pictures, rating results of the plurality of pictures, comment counts of the plurality of pictures, image analysis results of the plurality of pictures and attributes corresponding to user preferences.

15. The display device of claim 14, wherein the image analysis results are generated by recognizing the number of faces in each of the plurality of pictures.

16. The display device of claim 14, wherein the image analysis results are generated by recognizing specific faces in each of the plurality of pictures.

17. The display device of claim 14, wherein the image analysis results are generated by recognizing specific objects in each of the plurality of pictures.

18. The display device of claim 12, wherein the display characteristics of the plurality of pictures are display effects of the plurality of pictures.

19. The display device of claim 12, wherein the display unit is further utilized for displaying the plurality of pictures to generate the digital picture slide show according to the display characteristics of the plurality of pictures in an Internet album.

* * * * *